United States Patent
Ishii

(10) Patent No.: US 8,237,974 B2
(45) Date of Patent: Aug. 7, 2012

(54) IMAGE PROCESSING APPARATUS HAVING FUNCTION FOR PERFORMING SYNC PROCESSING TO TRANSFER AND STORE DATA OF CACHE MEMORY TO NON-VOLATILE MEMORY IN ACCORDANCE WITH PREDETERMINED CONDITION

(75) Inventor: Hiroshi Ishii, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 903 days.

(21) Appl. No.: 12/332,655

(22) Filed: Dec. 11, 2008

(65) Prior Publication Data
US 2009/0161162 A1   Jun. 25, 2009

(30) Foreign Application Priority Data
Dec. 19, 2007   (JP) ................ 2007-326639

(51) Int. Cl.
*G06K 15/00* (2006.01)
*G06F 3/12* (2006.01)
(52) U.S. Cl. .......................... 358/1.16; 358/1.1
(58) Field of Classification Search ............ 358/1.1, 358/1.9, 1.13, 1.14, 1.15, 1.16, 1.18, 474, 358/400, 468
See application file for complete search history.

(56) References Cited

U.S. PATENT DOCUMENTS

| | | | | |
|---|---|---|---|---|
| 6,101,576 A | * | 8/2000 | Kobayashi et al. | 711/122 |
| 6,304,336 B1 | * | 10/2001 | Sugaya | 358/1.16 |
| 2005/0157335 A1 | * | 7/2005 | Kuga et al. | 358/1.15 |

FOREIGN PATENT DOCUMENTS

| | | |
|---|---|---|
| JP | 11-120079 A | 4/1999 |
| JP | 2000-357059 A | 12/2000 |
| JP | 2005-011320 A | 1/2005 |
| JP | 2006-93963 A | 4/2006 |

OTHER PUBLICATIONS

Japanese Office Action dated Nov. 17, 2009 and English translation thereof issued in counterpart Japanese Application No. 2007-326639.
Japanese Office Action dated Feb. 9, 2010 and English translation thereof in counterpart Japanese Application No. 2007-326639.

* cited by examiner

*Primary Examiner* — Gabriel Garcia
(74) *Attorney, Agent, or Firm* — Holtz, Holtz, Goodman & Chick, PC

(57) ABSTRACT

An image processing apparatus includes: an input section which inputs image data; a non-volatile memory section which memorizes various data including image data inputted by the input section; a cache memory; a control section which carries out an asynchronous operation which writes data to the cache memory in stead of writing to the memory section as well as carries out a sync processing which transfers and stores the data of the cache memory to the memory section based on a predetermined condition; and a detecting section which detects a preparation for carrying out a shut down operation of a power of the image processing apparatus. The control section carries out the sync processing in a case when the preparation operation is detected by the detecting section.

17 Claims, 6 Drawing Sheets

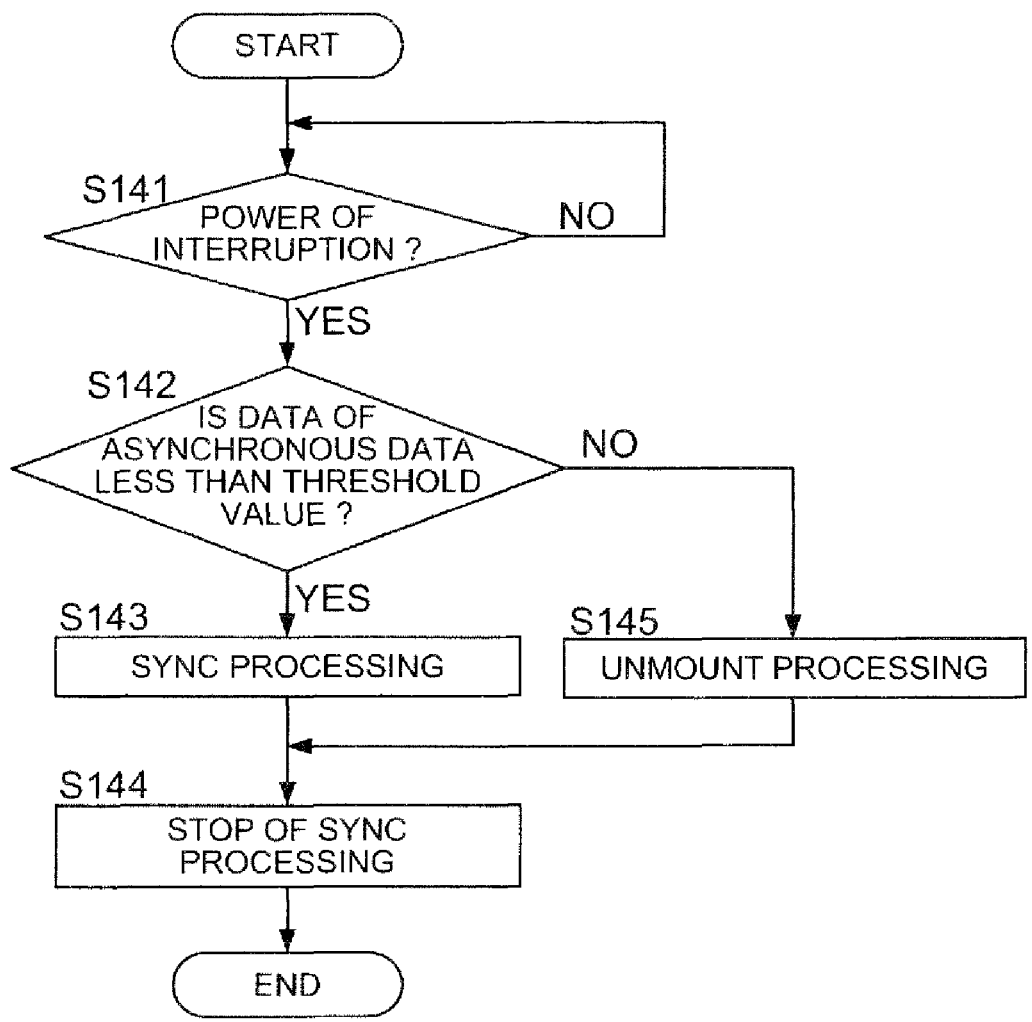

IMAGE PROCESSING APPARATUS HAVING FUNCTION FOR PERFORMING SYNC PROCESSING TO TRANSFER AND STORE DATA OF CACHE MEMORY TO NON-VOLATILE MEMORY IN ACCORDANCE WITH PREDETERMINED CONDITION

CROSS REFERENCE TO RELATED APPLICATION

The present application is based on Japanese Patent Application No. 2007-326639 filed with Japanese Patent Office on Dec. 19, 2007, the entire content of which is hereby incorporated by reference.

BACKGROUND OF THE INVENTION

1. Field of Technology

The present invention relates to an image processing apparatuses comprising a memory section constructed with a non-volatile hard disk and the like which memorize various data including image data, and having a function to carry out a synchronizing processing which transfers and memorizes the data of cache memory to the memory section based on a predetermined condition.

2. Description of Related Art

An image forming apparatuses such as a digital copying apparatus and a digital multifunction peripheral is required to control peripheral devices such as hard disk devices for storing large capacity image data and the like, network devices for sending and receiving image data and the like, and USB (Universal Serial Bus) devices, and therefore is generally equipped with an embedded operating system which supports a file system, and controls a whole system. The file system of the hard disk is mounted by "mount processing" which is executed at the time of start-up of the image forming apparatus, thereby the operating system becomes accessible to the file system.

In the above described image processing apparatus, the access speed of the hard disk is much slower than the operating speed of CPU (Central Processing Unit), therefore cache memory is arranged so as to increase the speed of the access to the hard disk device and thereby increase the processing speed of the whole system, and an asynchronous operation is executed in which the CPU generally writes data to the high speed accessible cache memory in stead of writing data direct to the hard disk device. Further in order to make synchronization (consistency of data) between the cache memory and the hard disk, a synchronous processing which transfers and writes asynchronous data (data in the cache memory which has not been written to the hard disk) from the cache memory to the hard disk is carried out at every predetermined interval or when an amount of the asynchronous data exceeds a predetermined threshold.

In a control shutting down a power of the image processing apparatus, when a main power switch is turned OFF by the operators or the power is shut down by a power failure, a firmware detects the falling down of the power supply by an interruption generated by detecting lowering of the supply voltage, the synchronous processing described above and "unmount processing" are executed while the firmware works by a secondary side output even after a primary side input has shut down, and thereby the data of the hard disk drive is protected.

However, in case when the amount of data to be synchronized is large, the processing time becomes long and may exceed the period to falling down of the secondary output. In some cases of built-in devices, the operable time of the secondary side circuit is prolonged by arranging a large capacity capacitor such as super capacitor at the secondary side circuit. Further, technologies enabling of continuing the operation of the secondary side circuit with a auxiliary power supply at the time of the power failure and the like, by arranging separately the auxiliary power supply such as an uninterruptible power source (for example, Japanese Patent Application No. 2000-357059) and a backup power supply (for example, Japanese Patent Application No. 2006-93963) are generally used.

However in the countermeasures of hardware using the auxiliary power supply or the super capacitor, a problem of increasing the cost of apparatus because of the high costs of the parts happens. In the case of the super capacitor, data of the hard disk drive may not be secured as the secondary side output is suspended during processing if the period of the synchronizing processing and the unmount processing extend more than expected unless a sufficient capacity is prepared. For example, when, during writing data to a super block which stores basic information of file system, the secondary side output is suspended and the writing terminates in the middle, errors of data of the super block occur. Therefore, at the worst case, the file system of the hard disk can not be recognized on the next start up and the image processing apparatus can not start up well.

One object of the present invention is to solve the above mentioned problems and supply an image processing apparatus, wherein an error of data to be memorized in the memory section is prevented on shutting down of the power supply and the prevention of the error of start up from the memory section can be realized with a simplified structure.

SUMMARY OF THE INVENTION

One aspect of the present invention is an image processing apparatus which includes: an input section which inputs image data; a non-volatile memory section which memorizes various data including the image data inputted by the input section; a cache memory; a control section which carries out an asynchronous operation which writes data to the cache memory in stead of writing to the memory section as well as carries out a sync processing which transfers and stores the data of the cache memory to the memory section based on a predetermined condition; and a detecting section which detects a preparation for carrying out a shut down operation of a power of the image processing apparatus, wherein the control section carries out the sync processing in case when the preparation operation is detected by the detecting section.

Another aspect of the present invention is a control method of an image processing apparatus which includes an input section which inputs image data, a non-volatile memory section which memorizes various data including image data inputted by the input section, and a cache memory, the control method including: carrying out an asynchronous operation which writes data to the cache memory in stead of writing to the memory section; carrying out a sync processing which transfers and stores the data of the cache memory to the memory section based on a predetermined condition; detecting a preparation operation for carrying out a power shut down operation of the image processing apparatus; and carrying out the sync processing responding to the detecting the preparation operation.

BRIEF DESCRIPTION OF THE DRAWINGS

FIG. 6 is a flow chart showing a power shut down processing according to a fourth preferred embodiment of the present invention.

DETAILED DESCRIPTION OF THE PREFERRED EMBODIMENTS

The preferred embodiments of the present invention are explained below based on the drawings.

Figure 1:
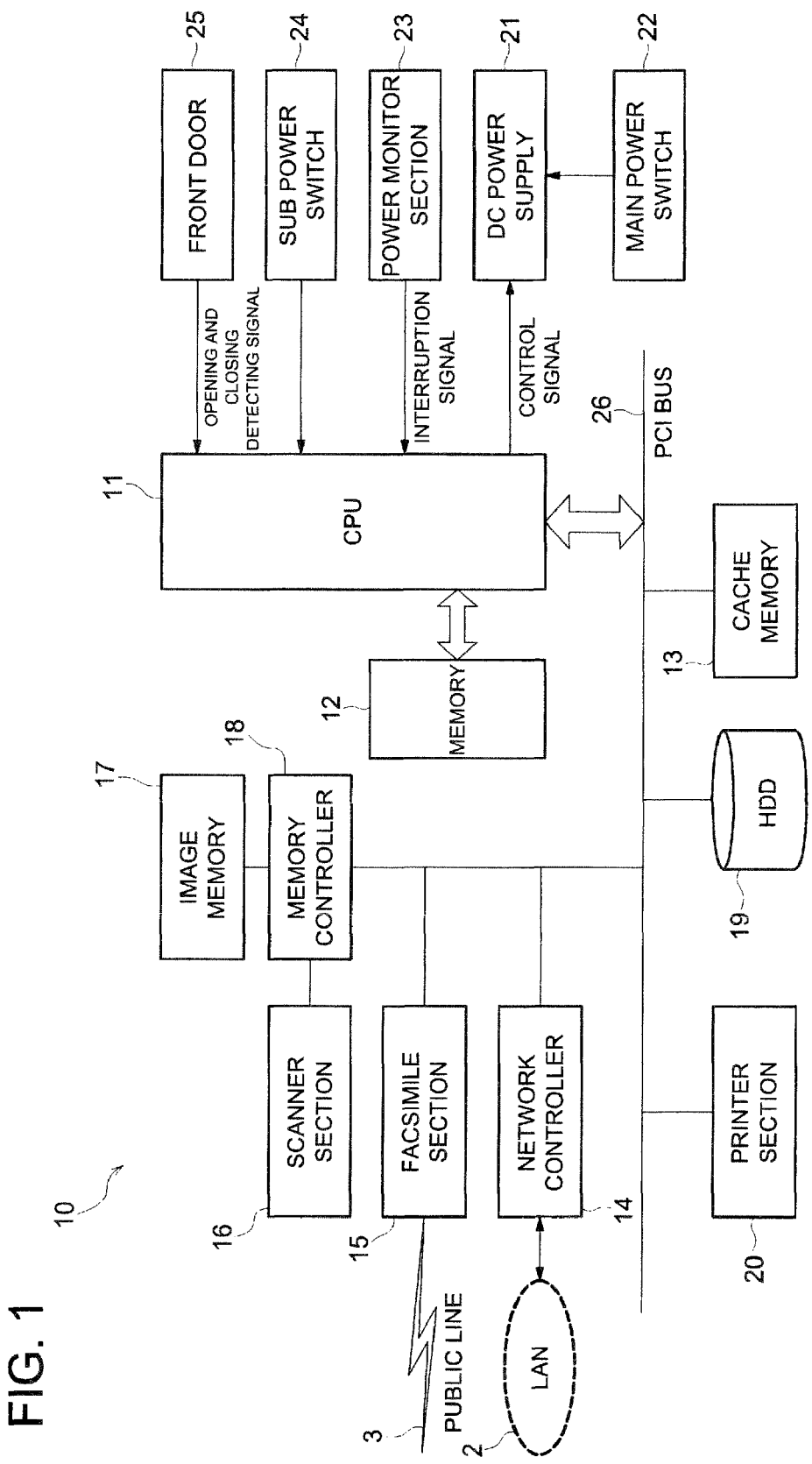
FIG. 1 is a block diagram showing the configuration of an image processing apparatus according to a first preferred embodiment of the present invention.

First Preferred Embodiment:

FIG. 1 is a block diagram showing the configuration of an image processing apparatus according to a first preferred embodiment of the present invention. The image processing apparatus 10 is configured as a digital Multi Functional Peripheral that has, a scanner function for optically reading a document, a copying function for forming and printing out the corresponding image obtained by the reading onto a sheet, a printing function for converting print data inputted from outside to image data and forming and printing out the converted image onto a sheet, a facsimile function for facsimile receiving and transmitting image data to and from external apparatus through public lines.

As shown in FIG. 1, the image processing apparatus 10 comprises a CPU 11 which controls integrally the whole operations including functions described above of the image processing apparatus 10, a memory 12 which connects with CPU 11 and includes flash memory in which various programs which CPU 11 executes and firmware are stored and RAM (Random Access Memory) as work memory of the CPU 11, a cache memory 13 connecting to the CPU 11 via a PCI bus 26. Here, the firmware is built in software in the image processing apparatus 10 for executing basic controls of various hardware of the image processing apparatus 10.

Further, a network controller 14, a facsimile section 15, a memory controller 18 under which a scanner section 16 and an image memory 17 are connected, a hard disk device 19 (Shown in drawing as HDD; Hard Disk Drive), and a printer section 20 connect to the PCI bus 26.

The network controller 14 connects to a network such as LAN (Local Area Network) 2 and has a function to develop print data constituted by character codes received from outside through the LAN 2 and so on to image data. The facsimile section 15 connects to the public line 3 and has a function to compress and expand the image data with the compression mode complying with facsimile, and a function to control various communication protocols for sending and receiving facsimile through the public line 3.

The scanner section 16 carries out a function to read a document and obtain the image data and comprises a light source for irradiate the document, CCD (Charge Coupled Device) image sensor for reading the document by one line in a width direction and A/D converter for converting analogue image signal outputted by the image sensor to digital image data. Although not shown in the drawing, the scanner section 16 further comprises a moving mechanism for moving the reading position per one line of the image sensor in a longitude direction of the document and optical parts comprising a lens and a mirror for guiding the reflected light from the document and focusing image on the image sensor.

The network controller 14, the facsimile section 15 and the scanner section 16 function as input section of the image data.

The image memory 17 carries out a function to temporarily memorize the image data outputted from the network controller 14, the facsimile section 15 and the scanner section 16. A memory controller 18 has a function to perform a transfer control for transferring the image data outputted from the network controller 14, the facsimile section 15 and the scanner section 16 to the image memory 17 and a function to compress and expand the image data.

The hard disk device 19 carries out a function for storing an Operating System (OS) which controls operations of the image processing apparatus 10, application software which works on the OS and so on, and a function for memorizing and storing various data including image data. The OS stored in the hard disk device 19 is an embedded OS which supports a file system. The cache memory 13 carries out the function for temporarily holding the data to be memorized in the hard disk device.

The printing section 20 carries out a function for forming and outputting an image corresponding to the image data onto the recording sheet using an electro-photographic process. The printing section 20 is configured as a so-called laser printer having a recording sheet conveying device (not shown in the drawing), a photoreceptor drum, a charging unit, a LD (Laser Diode) being controlled lighting corresponding to the image data inputted, a scanning unit for scanning the LASER light irradiated from the LD on the photoreceptor drum, a developing unit, a transfer and separation unit, a cleaning unit, and a fixing unit. The printing section 20 can be a LED printer for irradiating onto the photoreceptor drum by LED (Light Emitting Diode) in place of LASER light or other types of printer.

Hereafter, a flow from input to output of the image data regarding the copy operation and the print operation of the image forming apparatus 10 is explained.

In the copy operation, when reading of the image data of the document is carried out, the image data is outputted sequential from the scanner section 16 and is inputted to the image memory 17 through the memory controller 18. The image data is temporally stored in the image memory 17, then is transferred from the image memory through the memory controller 18 and is stored in the hard disk device 19.

In the print operation, when the network controller 14 receives the print data through LAN 2 and so on from an outside terminal (not shown in the drawing), the network controller develops the print data to the image data. The image data is inputted from the network controller 14 to the memory controller 18, is temporally stored in the image memory 17, is transferred from the image memory through the memory controller 18 and is stored in the hard disk device 19, same as the copy operation.

In both the copy operation and the print operation, the image data stored in the hard disk device is read out and outputted to the print section. The print section 20 carries out various image processing to the image data to be inputted, and then forms image onto the sheet by carrying out the lighting control of LD according to the image data and outputs the sheet.

A DC power supply 21 (Secondary side power supply) which generates a DC voltage by rectifying an AC voltage supplied from AC power supply (primary side power supply, not shown in the drawing) and supplies the DC voltage to various parts of the image forming apparatus 10, connects to the CPU 11. A main power switch 22 which is disposed inside of the image processing apparatus 10, switches between the supply and the shutdown of the AC power supply to the DC power supply 21 by an ON/OFF operation, and shuts down the power supply to the image processing unit on the OFF operation, connects to the DC power supply 21.

Further a power supply monitor device 23 which monitors the stop of the supply of the AC voltage to the DC power supply by the OFF operation of the main power switch 22 and the shutdown of the AC power supply described above and generates an interruption signal when the DC power supply 21 or the AC power supply become low thereby, and a sub power switch 24 which is disposed in an operation panel (not shown in the drawing) or at an exterior portion section of the image processing apparatus 10 and receives an operation for switching ON(stating up)/OFF(stop) of the image processing apparatus by software, connects to the CPU 11.

A front door 25 is openably and closably disposed at a front portion of the image processing section 10. When the front door 25 is opened, changing of parts and maintenance of an inside portion of the image processing apparatus can be done. When these operations inside of the machine are carried out, it is needed to suspend some of the operations and functions of the image processing apparatus 10 and stop a high voltage and so on, by safety reasons. So, an opening and closing detector (not shown in the drawing) such as a switch and a sensor for detecting the opening and closing of the front door 25 of the image processing apparatus is preinstalled. The image processing apparatus stops some parts of the operations and the functions and stops the high voltage power supply based on an opening and closing detecting signal (ON/OFF signal) which the opening and closing detector outputs according to the opening and closing state of the front door 25.

The main power switch 25 disposed inside of the image processing apparatus 10 is inoperable when the front door 25 is closed and is operable when the front door 25 is opened. The opening operation of the front door 25 is a releasing operation for releasing the inoperable state of the main power switch 22 and further is a preparation operation for a shutting down operation (OFF operation of the main power switch) of the image processing apparatus. The opening and closing detector connects to the CPU 11 and outputs the opening and closing detecting signal to the CPU 11 according to the opening and closing state of the front door 25.

At the CPU 11, the firmware detects the opening state of the front door 25 based on the opening and closing detecting signal inputted from the opening and closing detector. The firmware and the opening and closing detector carry out a function as the detector for detecting the preparation operation.

Further, the firmware provides, a function for carrying out a predetermined processing in case when the opening of the front door 25 is detected; a function for detecting the power stop of the image processing apparatus 10 by the OFF operation of the main power switch 22 or the shutdown of AC power supply by the power failure or pulling out of the power cord, by the interrupt signal from the power supply monitor device 23; a function for carrying out, by the detecting, various processing for stopping the operations of the image processing apparatus 10 during the period until the supply voltage (secondary side output) of the DC power supply 21 goes down to a predetermined value; a function for detecting an ON/OFF operation of the sub power switch 24; and a function for carrying out various processing for stopping the operations of the image processing apparatus 10 when the OFF operation of the sub power switch 24 is detected, and making the DC power supply 21 stop supplying power by outputting a control signal to the DC power supply 21.

Further, the CPU 11 carries out an "asynchronous operation" in which the CPU 11 normally writes the image data and various data to the cache memory 13 which can be accessed in a high speed in stead of writing directly to the hard disk device 19. Further, the CPU 11 carries out a "synchronous processing" (sync processing) in which data on the cache memory 13 which has not been written to the hard disk device 19 (asynchronous data) is transferred from the cache memory 13 and is written to the hard disk device 19, based on predetermined conditions. The predetermined conditions are following three kinds:

(1) Time (a constant time interval)
(2) Data amount (when the amount of asynchronous data exceeds a predetermined threshold value)
(3) Request from application software and so on.

Further, "mount processing" for mounting the file system on the hard disk device is carried out at the time of start-up of the image forming apparatus 10. By the mount processing, OS recognizes the hard disk device 10 and becomes enable to access the file system.

Further, when an operator carries out the OFF operation of the main power switch or the AC power supply is shut off by the power failure and pulling off of the power cord, the power supply monitor device 23 which has detected lowering of the voltages OL the DC power supply 21 or AC power supply generates and outputs the interruption signal to the CPU 11 and the firmware of the CPU 11 detects that the power supply of the image processing apparatus is stopping, then the image processing apparatus 10 normally carries out the "sync processing" and the "unmount processing" for unmounting the file system of the hard disk device 19.

The following describes the power down processing of the sub power supply and the processing on opening the front door.

Figure 2:
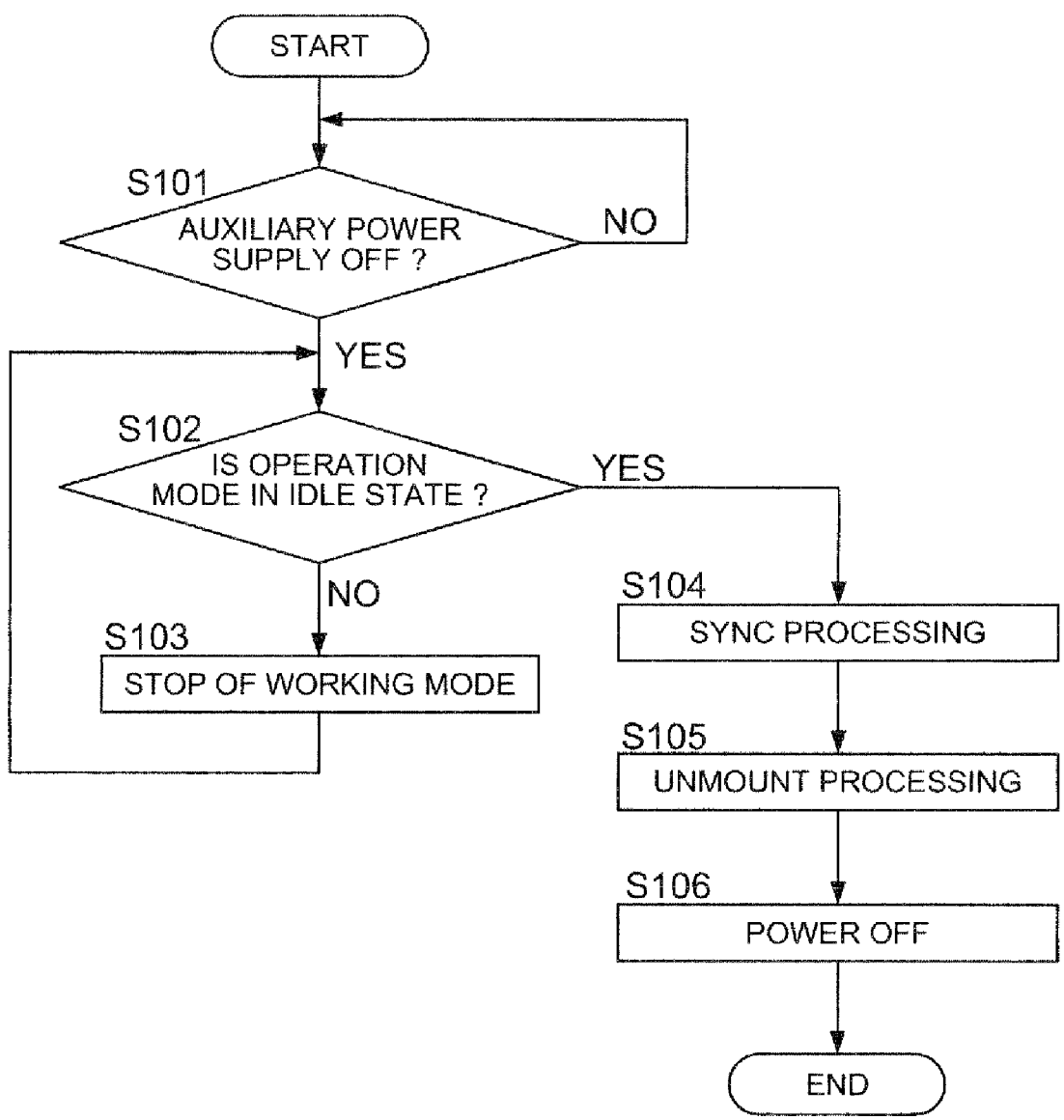
FIG. 2 is a flow chart showing a stop processing of an auxiliary power supply according to a first preferred embodiment of the present invention.

FIG. 2 shows a flow of the power down processing of the sub power supply which the CPU 11 (firm ware) carries out.

When the CPU 11 starts this processing (START), the CPU 11 monitors if the sub power supply switch is turned off or not (STEP S101). When the sub power supply switch is turned off (STEP S101; YES), the CPU 11 judges if the operation mode of the image processing apparatus 10 is in an idle state or not (STEP S102).

When the operation mode is not in the idle state (STEP S102; NO), the CPU 11 stops the modes in working (STEP S103) and goes back to STEP 102. For example, when a copy/print operation is going on, the CPU 11 stops the copy/print operation (stop of current job).

When the operation mode becomes the idle state or is in the idle state (STEP S102; YES), the CPU 11 carries out the sync processing (STEP S104) and transfers and saves the data which is asynchronous between the cache memory 13 and the hard disk device 19 from the cache memory 13 to the hard disk device 19.

When the sync processing is completed, the CPU 11 carries out the unmount processing (STEP S105) and unmounts the file system of the hard disk device 19. When the unmount processing is completed, the CPU 11 outputs the control signal to the DC power supply 21, powers off the DC power supply 21 (STEP S106), stops the power supply of the image processing apparatus 10, and ends the processing (END).

Figure 3:
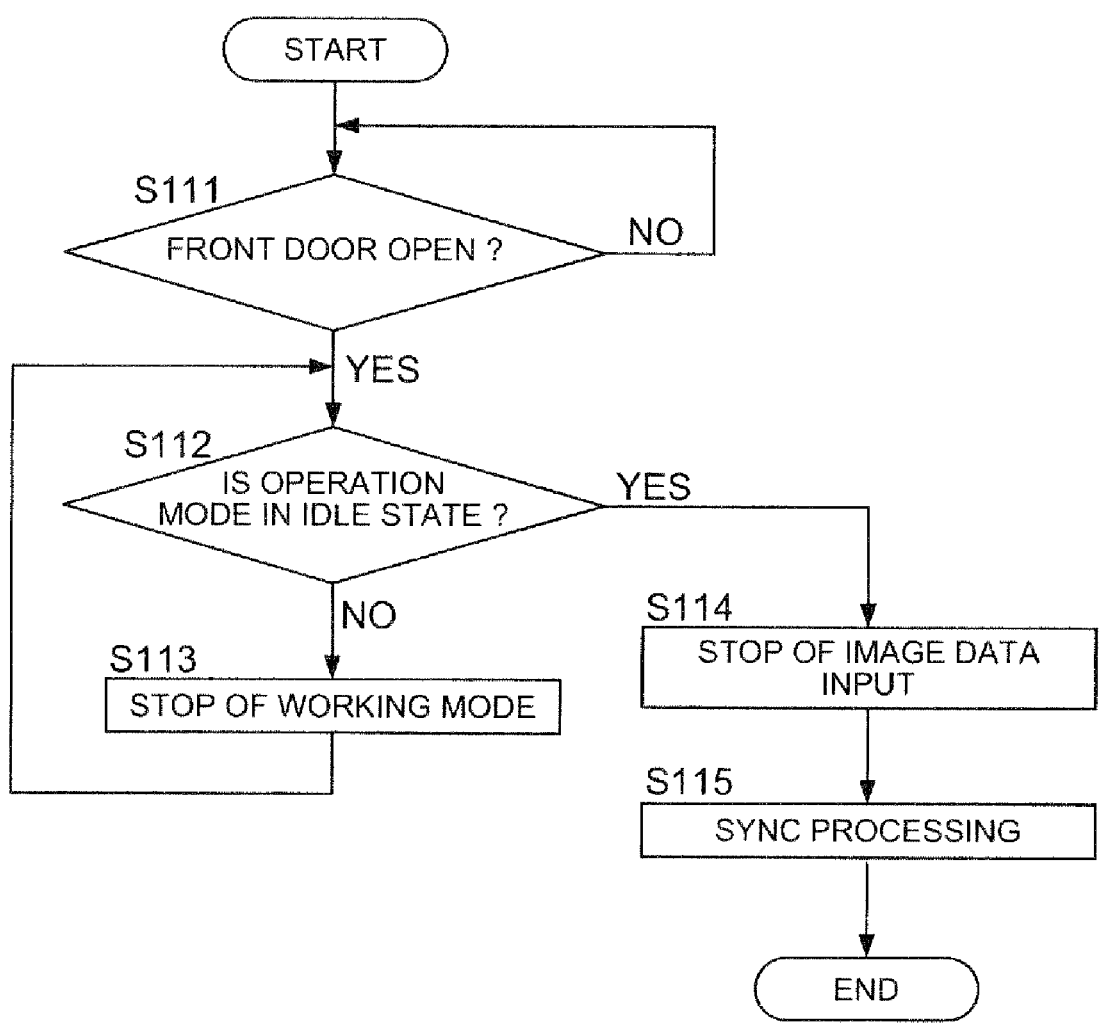
FIG. 3 is a flow chart showing a processing on opening a front door according to a first preferred embodiment of the present invention.

FIG. 3 shows a flow of the processing on opening front door which the CPU 11 (firm ware) carries out.

When the CPU 11 starts this processing (START), the CPU 11 monitors if the front door 25 is opened (OPEN) by an operator or not (STEP S111). When the front door 25 is opened (STEP S111; YES), the CPU 11 judges if the operation mode of the image processing apparatus 10 is in an idle state or not (STEP S112).

When the operation mode is not in the idle state (STEP S112; NO), the CPU 11 stops the modes in working (STEP S113) and goes back to STEP 112. In this stopping the modes in working, the current job is stopped as same as in the power down processing of the sub power supply.

When the operation mode becomes the idle state or is in the idle state (STEP S112; YES), the CPU 11 prohibits receiving new job (print/facsimile/scan/copy job), stops any input (entry) of image data through the network controller 14, the facsimile section 15 (STEP S114), and the scanner section 16. Then, the CPU 11 carries out the sync processing and ends the processing (END).

As described above, in the image processing apparatus 10 according the present embodiment, the processing speed of the whole system increases by carrying out the asynchronous operation normally. Further when the opening of the front door 25 is detected, the sync processing is immediately carried out and the data in the cache memory 13 is transferred and stored in the hard disk device 19. Thereby, in the power shut down control when an OFF operation of the main power switch is actually carried out after the front door 25 is opened, the sync processing can be carried out and completed in a short time because the data to be transferred from the cache memory 13 and stored in the hard disk device is a small amount or does not exist, therefore the time until the unmount processing of the hard disk device 19 which is carried out after the sync processing can be shortened.

Especially in the present embodiment, when the opening of the front door 25 is detected, in addition to carrying out the sync processing, the input (entry) of the image data is stopped, so writing of additional new image data does not exist in the hard disk device 19. Therefore in the sync processing actually carried out in response to the OFF operation of the main power switch 22, the processing time is reduced drastically because, only in case when data remains in the cache memory 13, the data is just needed to be transferred from the cache memory and saved in the hard disk.

Therefore the data to be stored in the hard disk device 19 can be stored correctly before the secondary side output goes low and becomes inoperable, without preparing such conventional countermeasure as increasing the operable time of the secondary side circuit by using the super capacitor or the auxiliary power supply.

Further in the embodiment, the function for detecting the preparing operation (opening operation of the front door 25) for carrying out the power supply stop operation (OFF operation of the main power switch 22) of the image processing apparatus is realized in a simplified configuration in which the conventional opening and closing detector for detecting the opening and closing state of front door and a software device (firmware) are combined.

Therefore in the image processing apparatus 10 of the present embodiment, with the simplified configuration of software measure, the error of the data to be stored in the hard disk device 19 on the power shut down can be avoided, therefore the situation in which the hard disk device 19 can not be recognized on the next start up of the image processing apparatus 10 can be avoided, and therefore the start up error from the hard disk device 19 can be prevented. Further, it is preferred that, the opening operation of the front door 25 is surely carried out before the OFF operation of the main power switch 22, therefore the opening operation of the front door 25 can be surely detected as above described preparation operation.

Figure 4:
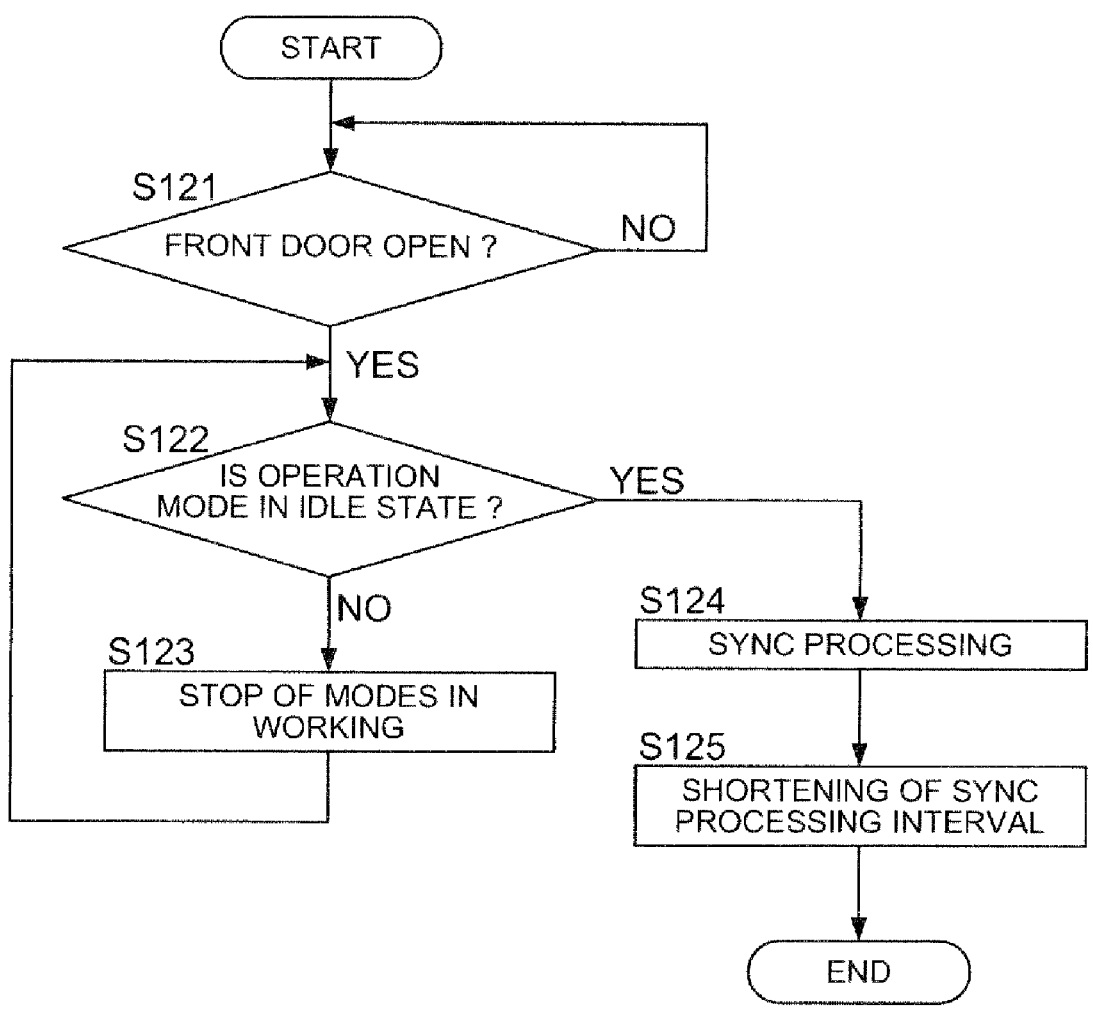
FIG. 4 is a flow chart showing a processing on opening the front door according to a second preferred embodiment of the present invention.

Second Preferred Embodiment:

Next, the processing on opening the front door according to the second preferred embodiment is explained hereafter. FIG. 4 shows the flow of processing on opening the front door according to the second preferred embodiment which the CPU 11 (firmware) carries out in the image processing apparatus described in the first preferred embodiment.

When the CPU 11 starts this processing (START), the CPU 11 carries out each step from STEP S121 to STEP S123 as same as STEP S111 to STEP S113 in the first preferred embodiment. When the operation mode of the image processing apparatus 10 is in the idle state (STEP S122; YES), the CPU 11 carries out the sync processing (STEP S124), transfers and stores the data which is asynchronous between the cache memory 13 and the hard disk device 19, from the cache memory 13 to the had disk device 19.

In the first preferred embodiment, before carrying out the sync processing (in the idle sate of the image processing apparatus 10), the reception or new print/facsimile/scan/copy job is stopped and any input of image data is stopped (refer to FIG. 3/STEP S114). However in the present embodiment, even in the idle state of the image processing apparatus 10, for example only receiving facsimile job is permitted and inputting image data by receiving the facsimile job is enabled. Therefore, when the facsimile section 15 receives the facsimile job after carrying out the sync processing according to STEP S124, the image data of the facsimile job is written to cache memory 13 and transferred and saved from the cache memory 13 to the hard disk device 19.

In this state in which only the facsimile job can be received (IDLE STATE), when the sync processing according to STEP 5124 is completed, then the CPU 11 changes carrying out condition of the sync processing in continuing the asynchronous processing, shortens the interval of the sync processing, and ends the processing (END).

For example, in case when the sync processing is carried out at constant interval of time, the changing carrying out condition is shortening the interval, or, in case when the sync processing is carried out when the amount of data which is asynchronous between the cache memory 13 and the hard disk device 19 exceeds a threshold value, reducing the threshold value. Thereby the carrying out interval of the sync processing can be reduced.

Therefore, in the processing on opening front door according to the preferred embodiment, the maximum data amount which is accumulated in the cache memory 13 becomes less than the normal case (in which the interval of carrying out the sync processing is not reduced), by reducing the interval of carrying out the sync processing by changing the carrying out condition of the sync processing after carrying out the sync processing according to the detection of opening the front door 25. Therefore, in the sync processing which carries out according to the OFF operation of the main power switch 22, the amount of data which is transferred and stored from the cache memory 13 to the hard disk device is small actually, therefore the processing time can be reduced drastically.

Figure 5:
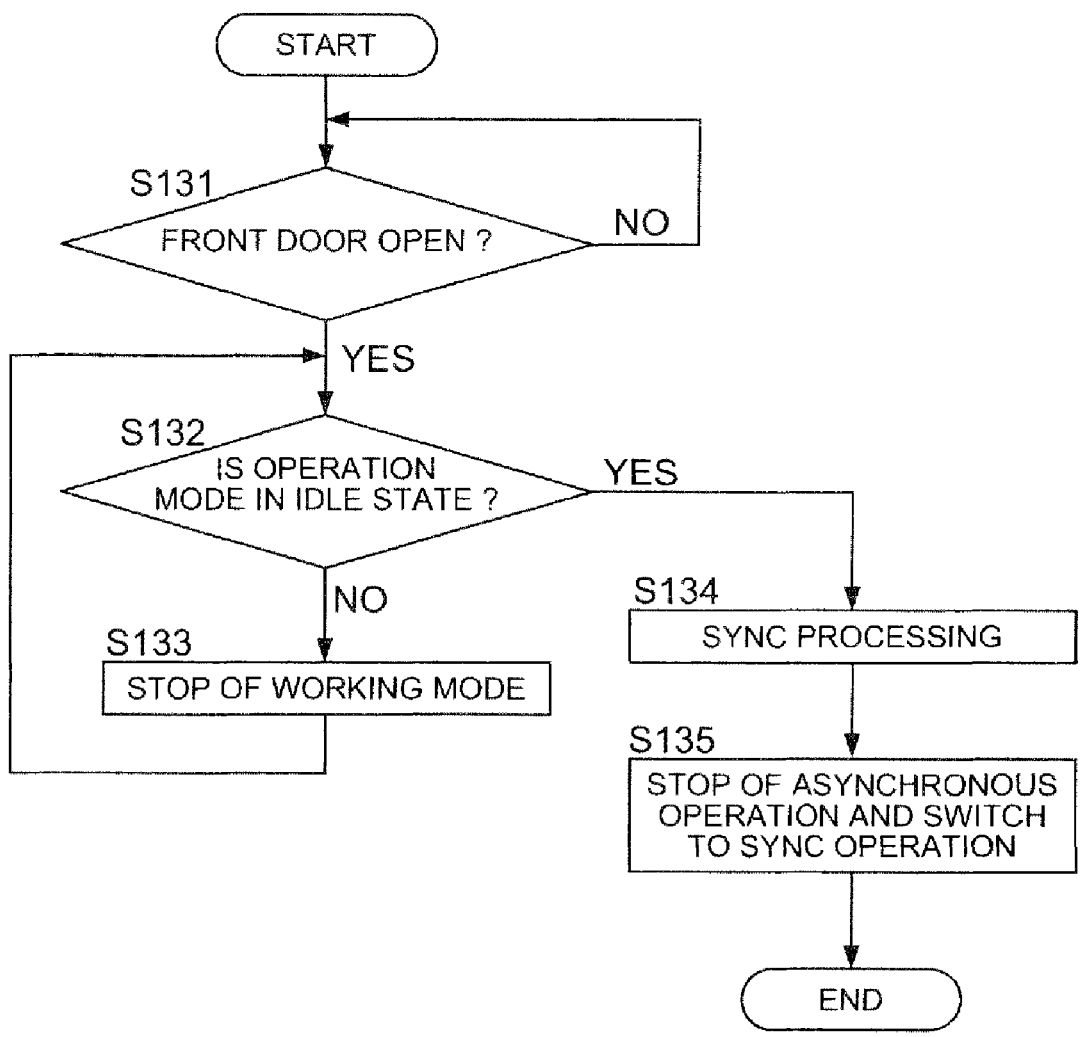
FIG. 5 is a flow chart showing a processing on opening the front door according to a third preferred embodiment of the present invention.

Third Preferred Embodiment:

Next, the processing on opening the front door according to the third preferred embodiment is explained hereafter. FIG. 5 shows the flow of processing on opening the front door according to the third preferred embodiment, in which the CPU 11 (firmware) carries out in the image processing apparatus described in the first preferred embodiment.

When the CPU 11 starts this processing (START), the CPU 11 carries out each step from STEP S131 to STEP S133 as same as STEP S111 to STEP S113 in the first preferred embodiment. When the operation mode of the image processing apparatus 10 is in the idle state (STEP S132; YES), the CPU 11 carries out the sync processing (STEP S134), transfers the data which becomes asynchronous between the cache memory 13 and the hard disk device 19, from the cache memory 13 and stores in the had disk device 19.

In this preferred embodiment, as same as the second preferred embodiment, even in the idle state of the image processing apparatus 10, for example, only inputting image data by receiving the facsimile job is enabled.

In this state in which only the facsimile job can be received (IDLE STATE), when the sync processing according to STEP S134 is completed, then the CPU 11 stops the asynchronous operation, changes to the synchronous operation (sync operation) in which the data is written simultaneously to both the cache memory 13 and the hard disk device 19 (STEP 5135), and ends the processing (END). Therefore, the image data of the facsimile job received after carrying out the sync processing according to STEP S134 is simultaneously written to the cache memory 13 and the hard disk device 19 by the sync operation of the CPU 11.

Therefore, in the processing on opening front door according to the preferred embodiment, the asynchronous operation is stopped and changed to the sync operation after carrying out the sync processing according to the detection of opening the front door 25, and thereby the synchronization (conformity) of data between the cache memory 13 and the hard disk device 19 can be achieved by the sync operation after carrying out the sync processing. Therefore, in the power shutdown control on receiving the OFF operation of the main power switch, the sync processing is not actually needed and the time until the unmount processing of the hard disk device is carried out and completed can be shortened.

Fourth Preferred Embodiment:

Next, the power shut down processing according to the fourth preferred embodiment is explained hereafter. FIG. 6 shows the flow of power shut down processing according to the fourth preferred embodiment of the present invention, which the CPU 11 (firmware) carries out in the image processing apparatus described in the first preferred embodiment. The processing explained here is a processing which is carried out without detecting the opening of the front door 25 in case when the power goes down or the power cord is pulled off and the power of the image processing apparatus is shut down.

When the CPU 11 starts this processing (START), the CPU 11 monitors if the interruption of the power OFF is generated by the power supply monitor device 23 or not (STEP S141) More specifically, before detecting the opening of the front door 25, the CPU 11 monitors if the interruption signal generated by detecting the shutting down of the AC power supply is inputted by the power supply monitor device 23 or not.

In case when the interruption of the power OFF is generated (STEP 141), the CPU 11 judges if the amount of data which is asynchronous between the cache memory 13 and the hard desk device 19 is less than a predetermined value or not (STEP 142).

In case when the amount of the asynchronous data is less than the predetermined value (STEP S142; YES), the CPU 11 carries out the sync processing (STEP 143), then carries out the unmount processing (STEP 143) and ends the processing (END).

In case when the amount of the asynchronous data exceeds the predetermined value (STEP S142; No), the CPU 11 suspends the sync processing (STEP 145), then carries out the unmount processing (STEP 143) and ends the processing (END).

Therefore, in the power shut down processing according to the preferred embodiment, when the power is made OFF (shut down) without detecting the opening the front door 25, disappearing and breaking of parts of data can be avoided in case when the sync processing is carried out, because all the data in the cache memory 13 is stored in the hard disk device by switching between carrying out the sync processing and not carrying out based on the amount of data to be transferred from the cache memory 13 to hard disk device 19. Further, in case when the sync processing is not carried out, such problems that, because of shutting down of the DC power supply 21 (secondary side output), correct data can not be written to the super block and so on, and the file system of the hard disk device becomes unable to be mounted at the next start up can be avoided.

Although some preferred embodiments of the present invention have been described referring to the drawings, actual embodiments are not restricted to those indicated in the preferred embodiments, and even if any modifications or additions are present within the scope and the intent of the present invention, they shall be construed to be included in the present invention.

For example, in the preferred embodiments, the case in which the opening operation of the front door 25 is detected as the preparation operation for carrying out the shutting down operation of power supply of the image processing apparatus is explained. However the preparation operation is not restricted to the opening operation of the front door 25. In case when a switch cover (power cover) is provided to prevent the switch from being easily operated, the opening operation of the switch cover can be the preparation operation.

Further, in case when the opening of the switch cover does not affects the operation or function of the image processing apparatus 10, that is, in case when stopping partly the operation or function and stopping the high voltage power supply of the image forming apparatus 10 in accordance with the opening of the cover switch as described in the first preferred embodiment are not needed, the operation and function of the image processing apparatus 10 can be continued.

Further, the detector for detecting the preparation operation is not restricted to the firmware which is built (fixedly provided) in the image processing apparatus 10 on opening the front door to carry out basic control of hardware and may be software which has a similar function. Further, the existing firmware and the software provided in the image processing apparatus can be utilized or utilized by being modified, or newly made one can be provided and used.

Further, in the processing on opening a front door explained in the first preferred embodiment (refer to FIG. 3), when the opening of the front door is detected, the sync processing is carried out after stopping inputting of the image data. However, the stopping inputting of the image data may be carried out after carrying out the sync processing.

Further, in the power shut down processing explained in the fourth preferred embodiment (refer to FIG. 6), the sync processing is decided to be carried out or not to be carried out based on the amount of data which is transferred from the cache memory 13 to the hard disk drive 19. However the sync processing may not be carried out at all, without switching between carrying out the sync processing and not carrying out based on the amount of the data image.

Further, in the processing on opening the front door explained from the first preferred embodiments to the third preferred embodiment, in case when, the front door is closed without carrying out OFF operation of the main power switch during detecting the opening of the front door 25, carrying out stopping inputting image data (STEP S114 of FIG. 3), shortening the interval of the sync operation (STEP S125 of FIG. 4), and stopping of the asynchronous operation and switching to the sync operation (STEP S135 of FIG. 5), the image processing apparatus 10 may return to be in the normal operation state that is the operation state in which receiving all jobs is permitted and the asynchronous processing and the sync processing are carried out based on a predetermined condition.

Further, as the memory device (memory section), the hard disk device is explained as an example in the preferred embodiments, however non volatile memory device other than hard disk device may be used if the non volatile memory device is accessible through the cache memory (asynchronous operation) and is capable of carrying out sync processing.

The present invention is not restricted to the digital multifunctional peripheral explained in the preferred embodiments and may be applied to other image forming apparatus such as digital copiers and digital printers.

In the preferred embodiments described above, the memory section comprises, for example a large capacity auxiliary non-volatile memory device (hard disk device) which can memorize various data including the image data outputted from the input section. In order to speed up writing data to the memory section, the data is written to the cache memory in stead of being written directly to the memory section (asynchronous operation). The data in the cache memory is transferred to the memory section from the cache memory by carrying out the sync procession based on the predetermined condition.

Further, when the preparation operation for carrying out shutting down operation of the image processing apparatus is detected the sync processing described above is carried out immediately and the data in the cache memory is reduced or the cache memory is emptied (the data in the cache memory which has not been yet stored in the memory section does not exist). In addition, it takes a certain time to carry out the actual power shutting down operation from the detection of the preparation operation until the shutting down of the power source, so it is possible to store all the data in the cache memory within the certain time, depending on the amount of the data.

Therefore, in the power shut down control when the shut down operation is actually received, the sync processing can be carried out and completed in a short time because the data to be transferred and stored from the cache memory to the memory section is a small amount or does not exist at all, and whole processing including the unmount processing carried out after the sync processing can be carried out and completed in a short time. Therefore, without preparing the countermeasure for extending the operable time of the secondary side circuit by using the high capacity capacitor, the auxiliary power supply and so on, the data to be stored in the memory section can be stored correctly before the secondary side out put becomes low and inoperable.

Further, in case when the operation section which is manually operated (physical operation is carried out) before the power shut down operation or the detector which detects the operation of the operation section is provided in the image processing apparatus, the detector and so on can be used as the detecting section which detects the preparation described above.

For example, an openable section for carrying out an internal operation such as maintenance and parts replacement is generally provided in the image processing apparatus. Further the software, the firmware and so on which detect the manual opening of the openable section by the detector such as switch and a sensor and have the control function which stops the parts of the operations and functions of the image processing apparatus based on the detected information may be provided.

When such the openable section (operation section) and the detector are provided and the opening operation of the openable section can be used as the preparation operation described above, the detecting section of the preparation section can be configured by combining the existing detector and the firmware or software. Further, the software or the firmware which is provided in the image processing apparatus may be used, the existing software and the firmware may be modified, and newly made software and the firmware may be provided.

Therefore, the error of the data which is stored in the memory section can be avoided with the simple configuration combining existing measures and son with the software measures, the problem that the memory section is not recognized at the next start up of the image processing apparatus and the start up error from the memory section can be avoided.

In the above preferred embodiments, when the preparation operation for carrying out the power shut down operation of the image processing apparatus is detected, in addition to carrying out the sync processing, inputting image data by the input section is stopped. Therefore the data in the cache memory decreases or the cache memory is emptied, and writing of new image data does not happen. Therefore, in the sync processing carried out in responding to the actual power shut down operation, the processing time decreases drastically because the data remaining in the cache memory is only needed to be transferred from the cache memory to the memory section only when data remains.

In the above preferred embodiments, when the preparation operation for carrying out the power shut down operation of the image processing apparatus is detected, the sync processing is immediately carried out and additionally after the sync processing is carried out, the interval of carrying out the sync processing is reduced. For example, the interval of carrying out the sync processing can be reduced by reducing the time interval if the sync processing is carried out every constant time interval, or by decreasing the threshold value if the sync processing is carried out in case when the data amount which exists in the cache memory yet to be stored to the memory section exceeds the predetermined threshold value. Therefore, the maximum amount of data accumulated in the cache memory becomes smaller than usual and the processing time is reduced drastically in the sync processing carried out by actually receiving the stopping operation of the power supply.

In the above preferred embodiments, when the preparation operation for carrying out the power shut down operation of the image processing apparatus is detected, the sync processing is immediately carried out and, after the sync processing is carried out, additionally carries out the sync operation which writes data simultaneously to the cache memory and to the memory section. Therefore because the data is synchronized between the cache memory and the memory section by the sync operation after the carrying out the sync processing and the sync processing is not needed in the power shut down control on actually receiving the stop operation, the time until unmount processing and so on are carried out and completed can be shortened.

In the above preferred embodiments, in case when the power is shut down without detecting the preparation operation for carrying out the power shut down operation of the image processing apparatus, the sync processing is not carried out.

Therefore, the problem that correct data can not be written to the memory section because of stopping of the secondary side output during writing the data to the memory section and the memory section can not be recognized at the next start up can be avoided.

In the above preferred embodiments, in case when the power is shut down without detecting the preparation operation for carrying out the power shut down operation of the image processing apparatus, the sync processing and the asynchronous processing are changed to each other based on the amount of the data to be transferred from the cache memory to the memory section. For example, the sync processing is carried out in case when the amount of the data can be completed transferring and storing within the time during the secondary side output operations is enabled, and the sync processing is not carried out in case when the amount of the data can not be completed transferring and storing.

Therefore, disappearing and breaking of parts of data can be avoided because all the data in the cache memory 13 is stored in the hard disk device in case when the sync processing is carried out. Further, the problem that correct data can not be written to the memory section because of stopping of the secondary side output during writing the data to the memory section and the memory section can not be recognized at the next start up can be avoided.

In the above preferred embodiments, it is preferred that the preparation operation is the operation for releasing the inoperable state of the power switch because the preparation operation is inevitably carried out before operating the power switch and the preparation operation can be securely detected.

In the above preferred embodiments, avoiding errors of data which is stored to the memory section on shutting down the power and preventing the start up problem from the memory section can be realized with simple configurations.

What is claimed is:

1. An image processing apparatus comprising:
an input section which inputs image data;
a non-volatile memory section which memorizes various data including the image data inputted by the input section;
a cache memory;
a control section which carries out an asynchronous operation which writes data to the cache memory instead of writing to the memory section, and which carries out a sync processing which transfers and stores the data of the cache memory to the memory section based on a predetermined condition; and
a detecting section which detects a preparation operation for carrying out a shut down operation of a power of the image processing apparatus,
wherein the control section carries out the sync processing in a case when the preparation operation is detected by the detecting section.

2. The image processing apparatus of claim 1, wherein the control section further stops inputting data from the input section in the case when the preparation operation is detected.

3. The image processing apparatus of claim 2, wherein the control section further prohibits receiving a new job in the case when the preparation operation is detected.

4. The image processing apparatus of claim 1, wherein the control section changes the predetermined condition and shortens an interval of carrying out the sync processing after carrying out the sync processing in accordance with detection of the preparation operation.

5. The image processing apparatus of claim 1, wherein the control section further stops the asynchronous operation and changes to a sync operation which simultaneously writes the data to the cache memory and to the memory section after carrying out a sync processing in accordance with detection of the preparation operation.

6. The image processing apparatus of claim 1, wherein the control section does not carry out the sync processing when the power is shut down without detecting the preparation operation by the detecting section.

7. The image processing apparatus of claim 1, wherein the control section controls whether or not the control the sync processing is carried out, based on an amount of the data to be transferred from the cache memory to the memory section when the power is shut down without detecting the preparation operation by the detecting section.

8. The image processing apparatus of claim 1, wherein the preparation operation is a releasing operation which releases an inoperable state of a power switch of the image processing apparatus.

9. The image processing apparatus of claim 8, wherein the preparation operation is an operation for opening a door of the image processing apparatus.

10. The image processing apparatus of claim 1, wherein a predetermined condition for carrying out the sync processing comprises at least one of a constant time interval, a time when the amount of the asynchronous data exceeds a predetermined threshold value, and a request from an application software.

11. A control method of an image processing apparatus which comprises an input section which inputs image data, a non-volatile memory section which memorizes various data including the image data inputted by the input section, and a cache memory, the control method comprising:
carrying out an asynchronous operation which writes data to the cache memory instead of writing to the memory section;
carrying out a sync processing which transfers and stores the data of the cache memory to the memory section based on a predetermined condition;
detecting a preparation operation for carrying out a power shut down operation of the image processing apparatus; and
carrying out the sync processing in response to detection of the preparation operation.

12. The control method of claim 11, further comprising stopping inputting image data by the input section in response to the detection of the preparation operation.

13. The control method of claim 11, further comprising changing the predetermined condition and shortening an interval of carrying out the sync processing after carrying out the sync processing in response to detection of the preparation operation.

14. The control method of claim 11, further comprising stopping the asynchronous operation and changing to a sync operation which simultaneously writes data to the cache memory and to the memory section after carrying out the sync processing in response to detection of the preparation operation.

15. The control method of claim 11, wherein the preparation operation is a releasing operation which releases an inoperable state of a power switch of the image processing apparatus.

16. The control method of claim 15, wherein the preparation operation is an operation for opening a door of the image processing apparatus.

17. The control method of claim 11, wherein the predetermined condition for carrying out the sync processing comprises at least one of a constant time interval, a time when the amount of the asynchronous data exceeds a predetermined threshold value, and a request from an application software.

* * * * *